(12) United States Patent
Menard

(10) Patent No.: US 7,246,825 B2
(45) Date of Patent: Jul. 24, 2007

(54) EROSION-INDICATING SAFETY FITTING

(75) Inventor: Marcel Menard, Grande Prairie (CA)

(73) Assignee: Worldwide Matrix Inc., Brooks, Alberta (CA)

(*) Notice: Subject to any disclaimer, the term of this patent is extended or adjusted under 35 U.S.C. 154(b) by 192 days.

(21) Appl. No.: 10/951,681

(22) Filed: Sep. 29, 2004

(65) Prior Publication Data

US 2005/0082822 A1 Apr. 21, 2005

Related U.S. Application Data

(60) Provisional application No. 60/512,094, filed on Oct. 20, 2003.

(51) Int. Cl.
*F16L 55/00* (2006.01)

(52) U.S. Cl. ............... 285/93; 285/122.1; 285/125.1

(58) Field of Classification Search ............ 285/93, 285/122.1, 125.1, 126.1, 189, 284.1, 13, 285/123.15; 166/97.1; 137/884; 73/86; 422/53

See application file for complete search history.

(56) References Cited

U.S. PATENT DOCUMENTS

| | | | | | |
|---|---|---|---|---|---|
| 1,939,466 | A | * | 12/1933 | Ruopp | 73/739 |
| 3,015,950 | A | | 1/1962 | Doctor et al. | 73/86 |
| 3,532,797 | A | | 10/1970 | Lunig | 13/1 |
| 3,846,795 | A | | 11/1974 | Jones | 340/421 |
| 4,389,877 | A | | 6/1983 | Lacey | 73/37 |
| 4,606,556 | A | | 8/1986 | Metzger | 285/16 |
| 4,621,953 | A | | 11/1986 | McGuth | 406/193 |
| 4,655,077 | A | | 4/1987 | Purvis et al. | 73/86 |
| 4,684,155 | A | | 8/1987 | Davis | 285/16 |
| 4,740,018 | A | * | 4/1988 | Kenmochi | 285/125.1 |
| 5,060,984 | A | | 10/1991 | Hess | 285/127 |
| 5,228,478 | A | | 7/1993 | Kleisle | 138/104 |
| 5,301,984 | A | | 4/1994 | Farris | 285/55 |
| 5,495,752 | A | | 3/1996 | Townsend | 73/86 |
| 5,590,916 | A | | 1/1997 | Liu | 285/127 |
| 5,740,863 | A | | 4/1998 | Ortloff et al. | 166/368 |
| 6,267,803 | B1 | | 7/2001 | Escobar et al. | 95/271 |

FOREIGN PATENT DOCUMENTS

| | | | |
|---|---|---|---|
| CA | 1133404 | 10/1982 | 189/67 |
| CA | 1295265 | 2/1992 | 189/67 |

* cited by examiner

*Primary Examiner*—Aaron Dunwoody
*Assistant Examiner*—Fannie C. Kee
(74) *Attorney, Agent, or Firm*—Sean W Goodwin; Linda M. Thompson

(57) ABSTRACT

An erosion-indicating safety fitting having a fluid passage formed within for connection in-line with a pipe and a cage of interconnecting breach passages formed into the block and surrounding the fluid passage, particularly at areas having a predicted risk of erosion. A pressure gauge, connected to the breach passages, registers a change in pressure to equal that of the pressure in the fluid passage should the material between the fluid passage and one or more of the breach passages be eroded by the flow of particulate-laden fluid within the fluid passage. The fitting can then be changed before compromising the safety of personnel and the environment.

15 Claims, 5 Drawing Sheets

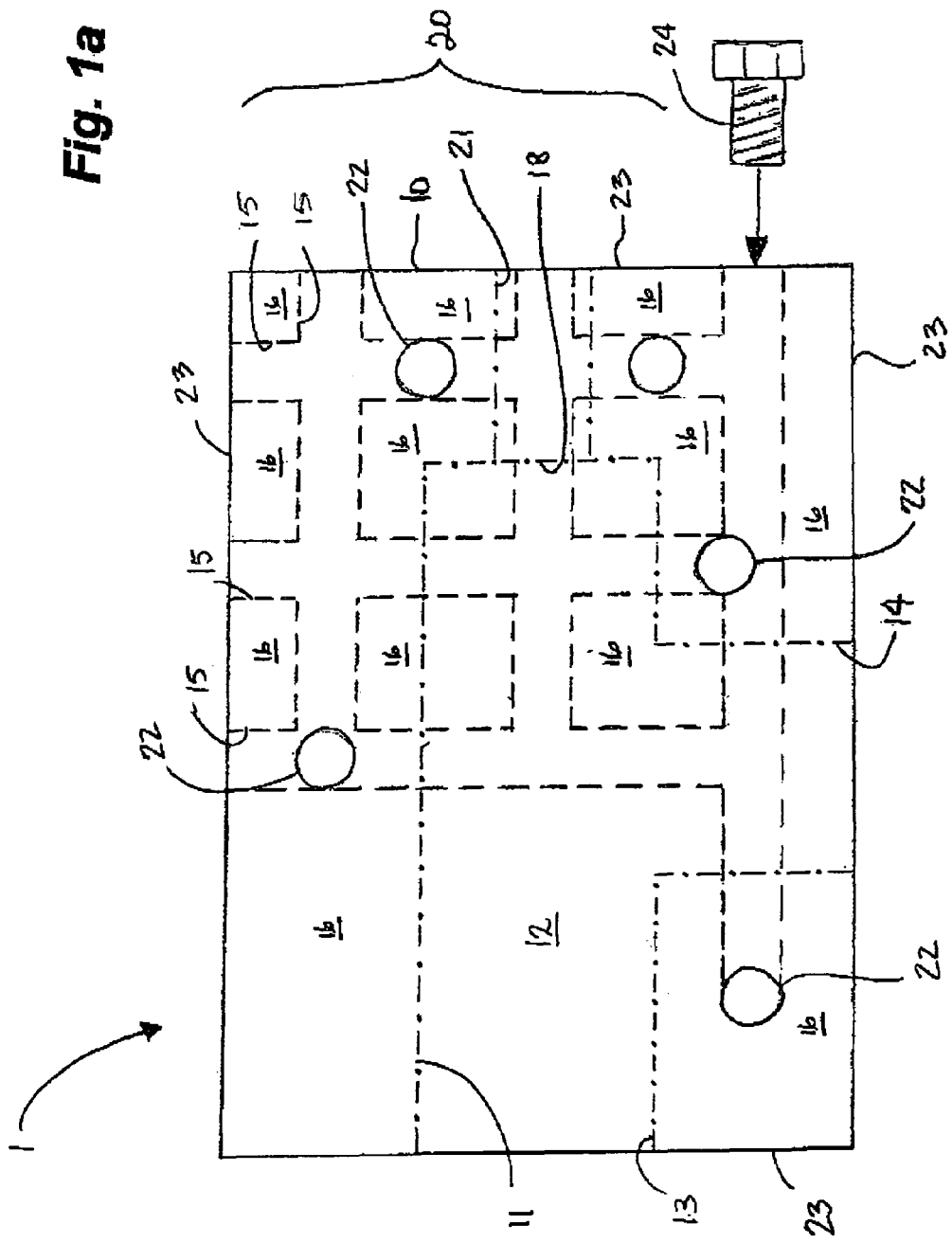

EROSION-INDICATING SAFETY FITTING

CROSS REFERENCE TO RELATED APPLICATION

This application is a regular application claiming priority of U.S. Provisional Patent application Ser. No. 60/512,094, filed on Oct. 20, 2003, the entirety of which is incorporated herein by reference.

FIELD OF THE INVENTION

The invention relates to apparatus and systems which indicate the safe operation of the apparatus and particularly to apparatus which indicate a failure in at least a portion of the apparatus and, more particularly, for fittings positioned downstream from a gas flow containing particulates, such as sand.

BACKGROUND OF THE INVENTION

Wellhead piping or other piping systems are at risk for erosion from particulate-laden fluid streams passing therethrough, often at very high pressures. The particulate-laden fluid is often environmentally and otherwise hazardous. Thus, breaches or failures in a fitting in said piping can be catastrophic.

In particular, sand, in a stream of fluid such as gas, can cause significant erosion to the components at areas of high turbulence such as changes in flow direction. Right angle or 90 degree elbows or T-junctions and bends are particularly vulnerable areas in an environment having high pressure ratings and where the fluid itself is hazardous, being, among other things, both toxic and flammable.

Many have attempted to resolve the problem by attempting to prevent corrosion of the fittings. Designs for fittings have been altered or materials selected which are less easily corroded, however, Applicant believes that the problem remains significant, particularly when dealing with fluids containing hazardous fluids, such as $H_2S$.

Some operators have altered the design by installed a tee fitting at an elbow, one branch of the tee being blocked off at the turn, ideally to collect sand to act as a buffer or pad to minimize erosion of the structural aspects of the elbow behind the sand pad. Unfortunately, the flow dynamics are complex and the sand may not reliably collect at the blocked branch, or wear occurs adjacent thereto and elsewhere.

Others have used low carbon steel pipes made of steel containing more chromium, or ceramic coated fittings, however the expense to replace fittings with a higher cost component is typically prohibitive and washing out may still occur.

Further, some have bored an elbow fitting into a block of steel to provide reinforcement to the elbow and delay failure due to washing out of the elbow.

It is known to use a variety of sensors or systems to detect corrosion and wear in components. U.S. Pat. No. 5,740,861 to Williams teaches a detector which includes a replaceable erosion block which is inserted into a fitting. The erosion block comprises a passage and bores intercepting the passage. A probe, having an erodable contact, is inserted into the bore of the block and is in contact with the passage. When a breach of the fitting occurs, the probe senses an increase of pressure in the bore which is detected via a pressure transducer at a monitoring station. A breach in the bore does not result in loss of pressure as pressure containment is maintained by the erosion block. Applicant believes that given the expense to manufacture and maintain such a system, only a single probe would be positioned at a point where the likelihood of wear is predicted, however, the remainder of the fitting is essentially unmonitored. Should a failure occur at a position other than predicted, the fitting is at risk of a catastrophic breach, without warning.

U.S. Pat. No. 4,779,453 to Hopenfield discloses a method of monitoring thinning in piping wherein a plurality of holes having different depths are bored in the outer surface of a pipe at selected locations having greatest risk of erosion or corrosion. Tracer materials are inserted into the holes and are plugged and welded. Monitoring equipment is positioned downstream from the holes and the fluid flow through the piping is monitored for the presence of the tracer material which would only be present as a result of a breach. Unique tracers can be positioned in holes having different depths or at different locations of turbulence in the pipe so that the degree and/or location of thinning can be readily determined. Use of holes which extend to the outer surface of the pipe, regardless of the strength of the plug or weld, may place the environment around the pipe at risk should a breach occur.

Others, such as U.S. Pat. No. 4,655,077 to Purvis et al have attempted to use sensors, such as conductive loops, embedded throughout the component to signal wear. As wear reaches each level of conductive loop positioned therein the sensor circuit is interrupted and thus detected. The continuity status of each loop is evaluated periodically, with an electrical closed circuit condition indicating structural integrity at that particular loop location, and an electrical open circuit condition indicating such a wear condition.

Clearly, what is required is means for detecting the integrity of a fitting and to provide some warning of imminent failure of the fitting that is simple, inexpensive, and reliable.

SUMMARY OF THE INVENTION

An erosion-indicating fitting, for incorporation into a fluid flow containing particulates, is formed in a body, such as a block. The block has a plurality of breach passages formed therein surrounding at least a portion of a fluid passage formed in the block. Two or more breach passages are interconnected to form a chamber and each chamber is fit with a pressure gauge which indicates a breach of intervening material between the chamber and the fluid passage. As the breach occurs, the pressure in the breach passage or chamber changes to equal the pressure in the fluid passage, the change in pressure being registered on the pressure gauge.

Therefore, in a broad aspect an erosion-indicating pipe fitting comprises: a unitary body having a fluid passage formed therethrough from an inlet to an outlet and an outer surface; a plurality of breach passages formed in the body spaced from and around the fluid passage forming intervening material therebetween, two or more of the plurality of breach passages, each being at a different position relative to the fluid passage and being fluidly interconnected for forming at least one chamber; and at least one pressure sensor in fluid communication with the at least one chamber, wherein the intervening material is sufficient to maintain pressure integrity of the fluid passage during operation and the unitary body is sufficient to maintain pressure integrity of the body when the intervening material is breached; and wherein, when the intervening material of at least one of the plurality of the breach passages is breached, a change in pressure in the at least one chamber indicates erosion of the fluid passage.

In one embodiment, the breach passages are interconnected to form a single chamber surrounding the fluid passage and the single chamber is fit with a pressure gauge. Alternatively, a plurality of chambers are formed from two or more interconnected breach passages and each of the plurality of chambers is fit with a pressure gauge.

Optionally, the fluid passage is formed having a blocked chamber, typically situated at an area of turbulence in the fluid flow within the fluid passage and most typically at a deviation in the direction of the flow from an inlet to an outlet. The blocked chamber acts to collect particulates from the fluid flow to create a pad which aids in preventing erosion of the fluid passage by preventing direct contact between the fluid passage and the flowing particulates.

BRIEF DESCRIPTION OF THE DRAWINGS

FIG. 1a is a schematic plan or bottom view of an embodiment of the invention illustrating a cage or grid of breach passages formed in a block body containing a fluid passage in the form of an elbow;

DETAILED DESCRIPTION OF A PREFERRED EMBODIMENT

Figure 1B:
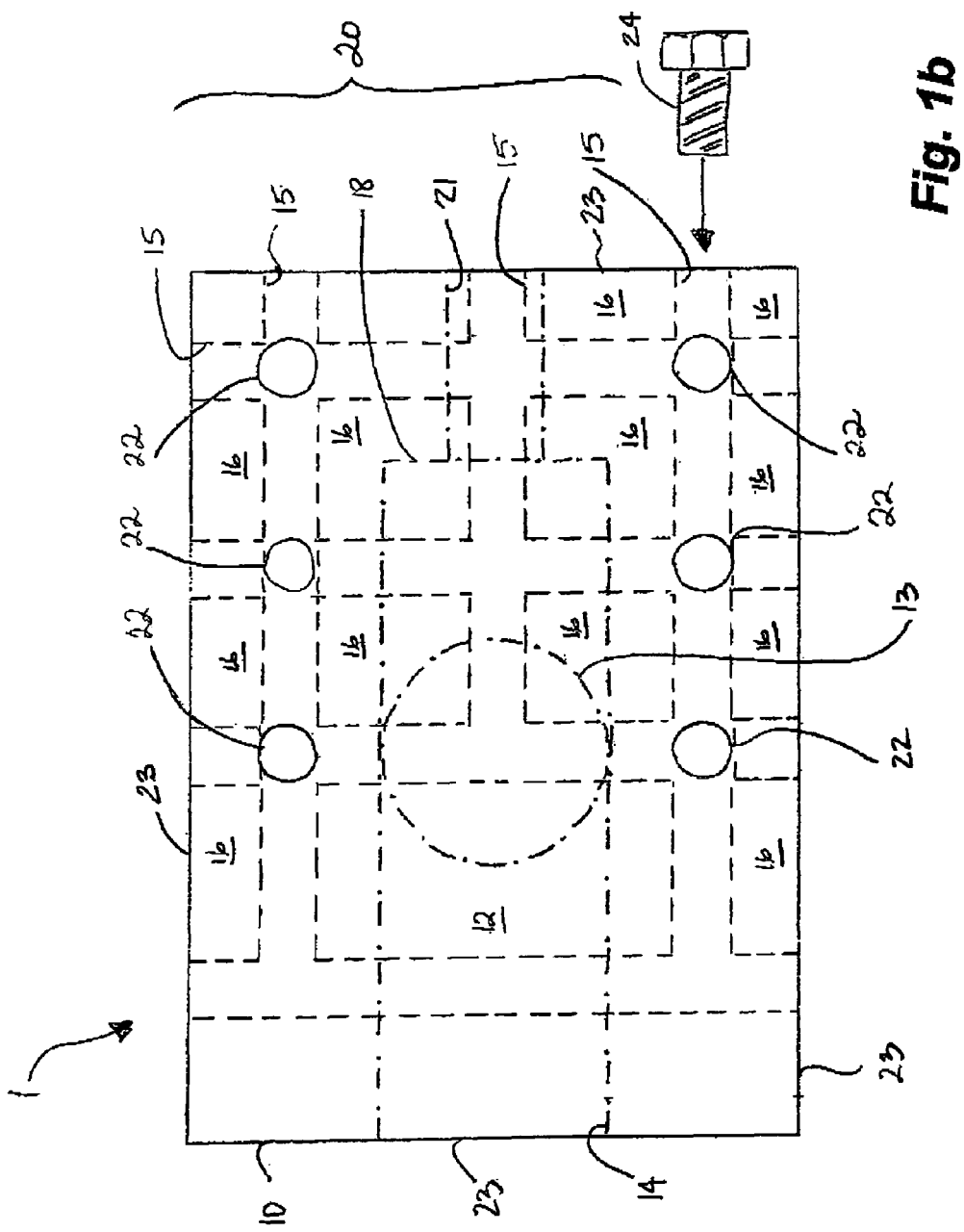
FIG. 1b is a side view according to FIG. 1a illustrating an outlet and a valve connected to the breach passages and chamber formed therefrom.
Figure 1C:
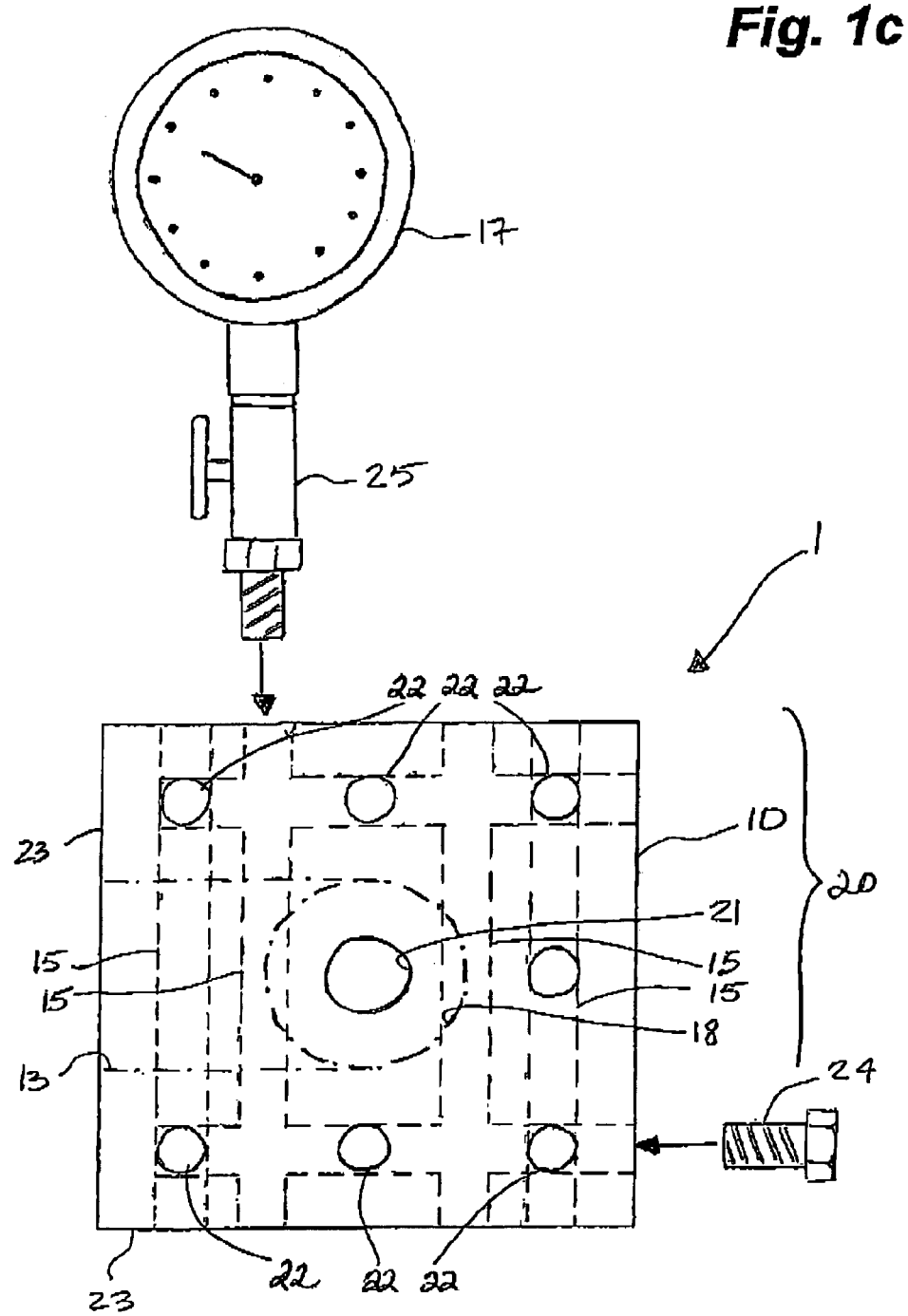
FIG. 1c is a plan view illustrating a pressure gauge connected to the chamber through the valve and an optional blocked chamber and sampling port.

As shown in FIGS. 1a-c and 2, an erosion-indicating pipe fitting 1 comprises a unitary body, such as a block 10, having a passage, such as an elbow 11, bored therein for forming a fluid passage 12. The fluid passage 12 has an inlet 13 and an outlet 14. The outlet 14 is typically positioned in a plane deviated from the inlet 13, such as a right angles to the inlet 13 in the case of an elbow 11. A network, grid, matrix or cage 20 comprising a plurality of breach passages 15 are provided in the block 10 around the fluid passage 12. While shown herein as a rectilinear cage 20, those skilled in the art would understand that other orientations of the breach passages 15 are possible.

The breach passages 15 are spaced from and around the fluid passage 12 to allow sufficient intervening material 16 of the block therebetween to provide structural support for the fluid passage 12 and, more particularly, to provide support when the fluid passage 12 contains a fluid stream, often hazardous, under high pressure, typically in the order of about 3,000 to about 5,000 psi. Typically, the fitting 1 may be used in the oil and gas industry downstream from a choke or a separator inlet (not shown), the fluid stream containing sand and particulates, and often $H_2S$.

The breach passages 15 are fit with a pressure indicator (FIG. 1c), preferably a gauge 17. Two or more of the breach passages 15 are interconnected to form a chamber 15a, each chamber 15a being fit with a pressure gauge 17. Preferably, the number of pressure gauges 17 required to monitor pressure within the breach passages 15 is minimized. More preferably, all of the breach passages 15 in the cage 20 are interconnected to form a single chamber 15a, requiring a single pressure gauge 17.

Erosion of the fluid passage 12, at any point thereabout, will eventually breach the intervening material 16 and establish fluid communication between the fluid passage 12 and one or more of the breach passages 15 or chambers 15a. The fluid communication therebetween will result in an equilibrium between a pressure in the fluid passage 12 and the breach passage 15 or chamber 15a, which is indicated at the pressure gauge 17. The pressure in the breach passage 15 or chamber 15a will increase or decrease accordingly to the pressure in the fluid passage 12, depending upon an initial pressure within the breach passage 15 or chamber 15a.

Any significant change in pressure, as indicated by the pressure gauge 17, is indicative of erosion causing a breach of the intervening material of at least one breach passage 15 within the block 10 and therefore signals that erosion has occurred and that the block 10 should be changed.

The fitting 1 is designed to ensure that the material used to form the block 10 and to contain the breach passages 15 is suitable to contain the fluid passage 12 pressure during operation and if the intervening material 16 between at least one of the breach passages 15 and the fluid passage 12 is eroded. Further, the spacing and the amount of intervening material 16 between the breach passages 15 is calculated to ensure maintenance of pressure of the fluid passage 12 during operation.

Preferably, the positioning of the breach passages 15 is designed so as to position two or more breach passages 15 adjacent areas having the greatest likelihood of erosion/corrosion, the two or more breach passages 15 being fluidly connected to form a chamber 15a. The spacing may be altered to be more closely spaced or otherwise altered, as empirical data would suggest. For example, a closer spacing of the breach passages 15 may be provided adjacent areas of greatest turbulence, typically being at a change of direction in the flow therethrough. Further, breach passages 15 may be positioned, albeit at greater intervals throughout the block 10, at areas that are not intuitively thought to be the most likely to erode, thus providing a safety aspect to deal with the unpredictable nature of erosion in a turbulent environment.

Optionally, the fluid passage 12 can further include a blocked chamber 18 which may or may not aid in collecting particulates and forming a particulate pad (not shown), typically formed of sand trapped at or near the area of greatest turbulence, typically at the point of change of direction of fluid flow within the fluid passage 12. The sand pad (not shown), if formed, may act to prevent or delay washing out of the intervening material 16 adjacent the area in which the sand pad is formed.

Further, a sample port 21 may be formed in the fitting 1 to permit access to the fluid passage 12.

Figure 2:
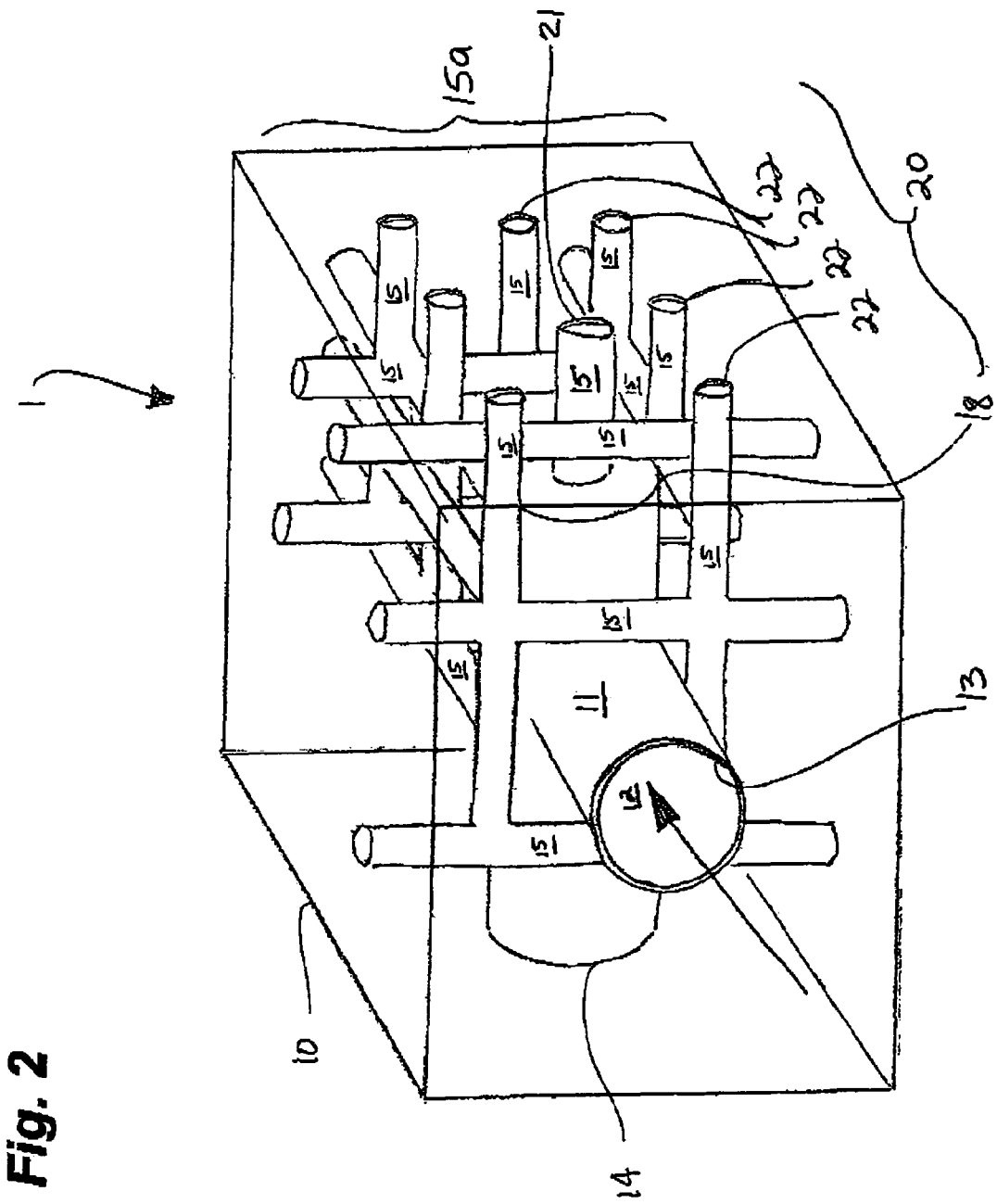
FIG. 2 is a transparent isometric view illustrating an embodiment of a relationship of the cage of breach passages relative to the fluid passage within the block.

In a preferred embodiment, a shown in FIGS. 1a-b and 2, breach passages 15 are formed in an intersecting cage 20 around the fluid passage 12. All of the breach passages 15 are interconnected to form a single chamber 15a having a single pressure gauge 17 connected thereto. An optional blocked chamber 18 extends outwardly from the fluid chamber 12 for potentially forming a sand pad adjacent a deviation flow within the fluid passage 12.

Typically, each breach passage 15 is bored into the block 10 from outer surfaces 23 resulting in openings 22 at the outer surfaces 23 which are subsequently blocked to prevent fluid egress Therefrom, using plugs 24, such as threaded NPT plugs, which are capable of withstanding pressures in the fluid passage 12. One or more of the openings 22 may be fit with a valve 25, such as a threaded NPT valve. At least one of the valves 25 permits connection of at least one pressure gauge 17. Additional valves 25 permit connection of additional pressure gauges 17 or alternatively, access to the breach passages 15 for filling or bleeding off fluids which may be added should air entrainment, as a result of a failure, jeopardize the integrity of the system to which the fitting 1 is fluidly connected. Optionally, an additional valve 25 may be used as an expansion port.

A sampling port 21 is formed extending from the blocked chamber 18 to the outer surface 23 to permit access to the fluid passage 12.

Figure 3:
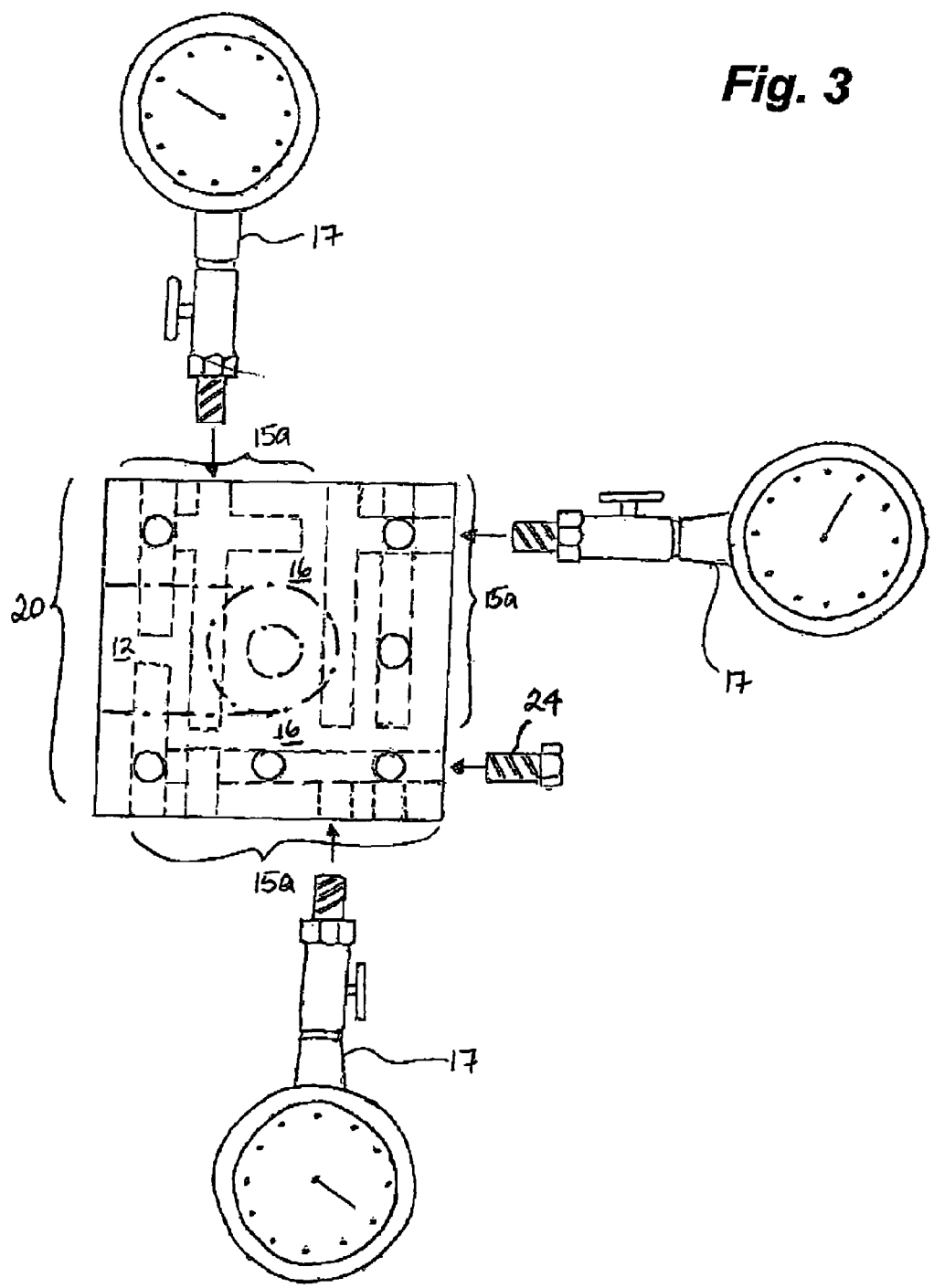
FIG. 3 is a plan view illustrating a plurality of pressure gauges, each connected to one of a plurality of chambers through a plurality of valves.

In another embodiment of the invention, shown in FIG. 3, a plurality of chambers 15a are formed adjacent different areas of the fluid passage 12, preferably with some in closer proximity to the fluid passage 12 and others spaced outwards from the fluid passage 12. Each of the plurality of chambers 15a is fit with a pressure gauge 17 to indicate erosion of the intervening material 16 between the fluid passage 12 and the chamber 15a in which the individual pressure gauge 17 is fit. In use, a change in pressure at one or more of the pressure gauges 17 is indicative of erosion within the fitting 1 and may signal the need to replace the fitting 1, depending upon the location of the breach.

Alternatively, one may implement castings or other manufacturing techniques which result in a cage 20 without significant boring or machining. The resulting cage 20 may be oriented in a variety of patterns, only one of which may be rectilinear, about the fluid passage 12. Openings 22 are bored for insertion of valves for fluid communication with breach passages 15 or chambers 15a within the cage 20.

In use, fittings 1 according to embodiments of the invention, are incorporated into the fluid flow in wellheads and the like at areas of greatest turbulence in the fluid flow. The particulates, such as sand, typically found in gas flows within wellheads, act within the fittings 1 to erode the intervening material 16 between the fluid passage 12 and the chambers 15a formed of fluidly interconnected breach passages 15. When a breach occurs between the fluid passage 12 and at least one of the breach passages 15, a pressure gauge 17 fluidly connected to the chamber 15a containing the breach passage 15 indicates a change in pressure, signalling erosion within the fitting 1. As the body 10 is designed to withstand the pressure within the fluid passage 12 in the event of a breach of at least one of the breach passages 15, the fitting 1 remains operable to contain the pressure, however an operator is signalled that the fitting 1 has sustained significant erosion and needs to be changed.

The embodiments of the invention in which an exclusive property or privilege is claimed are defined as follows:

1. An erosion-indicating pipe fitting comprising:
   a unitary body having a fluid passage formed therethrough from an inlet to an outlet and an outer surface;
   a plurality of breach passages formed in the body spaced from and around the fluid passage forming intervening material therebetween, two or more of the plurality of breach passages, each being at a different position relative to the fluid passage and being fluidly interconnected for forming at least one chamber and
   at least one pressure sensor in fluid communication with the at least one chamber,
   wherein an amount of the intervening material is sufficient to maintain pressure integrity of the fluid passage during operation and the unitary body is effective to maintain pressure integrity of the body when the intervening material is breached; and
   wherein, when the intervening material of at least one of the plurality of the breach passages is breached, a change in pressure in the at least one chamber indicates erosion of the fluid passage.

2. The erosion-indicating pipe fitting as described in claim 1 wherein the plurality of breach passages form a cage around the fluid passage.

3. The erosion-indicating pipe fitting as described in claim 1 wherein each of the plurality of breach passages extends from the outer surface, forming openings at the outer surface and further comprises plugs for blocking fluid egress from the openings.

4. The erosion-indicating pipe filling as described in claim 1 wherein the plurality of breach passages forms a rectilinear cage about the fluid passage.

5. The erosion-indicating pipe fitting as described in claim 4 wherein each of the plurality of breach passages in the rectilinear cage extends from the outer surface, forming openings at the outer surface and further comprises plugs for blocking fluid egress from the openings.

6. The erosion-indicating pipe fitting as described in claim 1 wherein the at least one pressure sensor is a pressure gauge, fluidly connected to the at least one chamber through an opening at the outer surface.

7. The erosion-indicating pipe fitting as described in claim 1 wherein the plurality of breach passages are interconnected for forming a single chamber and the at least one pressure sensor is a single pressure gauge fluidly connected thereto.

8. The erosion-indicating pipe fitting as described in claim 1 wherein the outlet is positioned in a plane deviated from the inlet, forming a change in direction of fluid flow in the fluid passage.

9. The erosion-indicating pipe fitting as described in claim 8 wherein the fluid passage further comprises a blocked chamber formed between the inlet and the outlet and adjacent the change in direction of fluid flow in the fluid passage for collecting particulates and forming a pad at or near the change in direction of fluid flow.

10. The erosion-indicating pipe fitting as described in claim 9 further comprising a sampling port extending from the fluid passage to the outer surface to provide access to the fluid passage.

11. The erosion-indicating pipe fitting as described in claim 3 further comprising one or more valves fluidly connected to the at least one chamber at one or more of the openings.

12. The erosion-indicating pipe fitting as described in claim 11 wherein one of the one or more valves comprises a valve for filling or bleeding of fluids from the at least one chamber.

13. The erosion-indicating pipe fitting as described in claim 12 wherein the one or more valves comprise a valve for connecting between the at least one chamber and the at least one pressure sensor.

14. The erosion-indicating pipe fitting as described in any of claims 1 to 13 wherein the inlet and the outlet of the fluid passage are adapted for use in piping having a flow of particulate laden fluid therethrough.

15. The erosion-indicating pipe fitting as described in any of claims 1 to 13 wherein the inlet and the outlet of the fluid passage are adapted for use at a Wellhead having a flow of particulate laden fluid therethrough.

* * * * *